US006961390B1

(12) United States Patent
Yuan et al.

(10) Patent No.: US 6,961,390 B1
(45) Date of Patent: Nov. 1, 2005

(54) SYSTEMS AND METHODS FOR NON-CASUAL CHANNEL EQUALIZATION IN AN ASYMMETRICAL NOISE ENVIRONMENT

(75) Inventors: Warm Shaw Yuan, San Diego, CA (US); Daniel M. Castagnozzi, Lexington, MA (US); Alan Michael Sorgi, San Diego, CA (US); Keith Michael Conroy, Salem, NH (US)

(73) Assignee: Applied Micro Circuits Corporation, San Diego, CA (US)

(*) Notice: Subject to any disclaimer, the term of this patent is extended or adjusted under 35 U.S.C. 154(b) by 653 days.

(21) Appl. No.: 10/066,966

(22) Filed: Feb. 4, 2002

Related U.S. Application Data

(63) Continuation-in-part of application No. 10/020,426, filed on Dec. 7, 2001.

(51) Int. Cl.$^7$ .................... H04L 25/06; H04L 25/10

(52) U.S. Cl. .................. 375/317; 375/348; 375/286; 375/229; 714/721

(58) Field of Search ................... 375/348, 317, 375/287, 286, 289, 229, 230, 232; 714/721

(56) References Cited

U.S. PATENT DOCUMENTS

| 5,850,357 | A | * | 12/1998 | Shefer | .................. 708/819 |
| 5,896,422 | A | * | 4/1999 | Lu | .................. 375/317 |
| 6,188,737 | B1 | | 2/2001 | Bruce et al. | |
| 6,493,329 | B1 | * | 12/2002 | Leung | .................. 370/335 |

* cited by examiner

Primary Examiner—Mohammed Ghayour
Assistant Examiner—Juan Alberto Torres
(74) Attorney, Agent, or Firm—Law Office of Gerald Maliszewski; Gerald Maliszewski

(57) ABSTRACT

A system and method are provided for non-causal channel equalization in a communications system. The method comprises: receiving a non-return to zero (NRZ) data stream input; establishing thresholds to distinguish a first bit estimate; comparing the first bit estimate in the NRZ data stream to a second bit value received prior to the first bit, and a third bit received subsequent to the first bit; in response to the comparisons, determining the value of the first bit; tracking the NRZ data stream inputs in response to sequential bit value combinations; maintaining long-term averages of the tracked NRZ data stream inputs; adjusting the thresholds in response to the long-term averages; and, offsetting the threshold adjustments to account for the asymmetric noise distribution. Two methods are used to offset the threshold adjustments to account for the asymmetric noise distribution: forward error correction (FEC) decoding and tracking the ratio of bit values.

28 Claims, 10 Drawing Sheets

NRZ DATA STREAM
INPUTS

V1 — DEFINITE "1"

Vopt —
"0" IF BOTH 2nd AND 3rd BIT VALUE DECISIONS ARE "1"
"1" IF ONLY ONE OF THE 2nd AND 3rd BIT VALUE DECISIONS IS A "1"
"1" IF BOTH 2nd AND 3rd BIT VALUES ARE "0"

"1" IF BOTH 2nd AND 3rd BIT VALUE DECISIONS ARE "0"
"0" IF ONLY ONE OF THE 2nd AND 3rd BIT VALUE DECISIONS IS A "0"
"0" IF BOTH 2nd AND 3rd BIT VALUES ARE "1"

V0 — DEFINITE "0"

SYSTEMS AND METHODS FOR NON-CASUAL CHANNEL EQUALIZATION IN AN ASYMMETRICAL NOISE ENVIRONMENT

RELATED APPLICATIONS

This application is a continuation-in-part of a pending application entitled, SYSTEM AND METHOD FOR NON-CAUSAL CHANNEL EQUALIZATION, invented by Castagnozzi et al., Ser. No. 10/020,426, filed Dec. 7, 2001.

BACKGROUND OF THE INVENTION

1. Field of the Invention

This invention generally relates to digital communications and, more particularly, to systems and methods for minimizing the effects of inter-symbol interference in a non-return to zero (NRZ) data channel when the noise distribution is asymmetric.

2. Description of the Related Art

FIG. 1 is a diagram illustrating a signal recovered from a binary symmetric, non-dispersive channel in the presence of symmetric noise (prior art). Conventionally, the signal is filtered with a transfer function matched to the signaling waveform (in this case a one unit step) and thresholded at the voltage level most likely to yield the transmitted bit. To recover the transmitted information, a hard decision must be made as to the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and pseudorandom scrambling that is often used in the transmission of NRZ data streams. However, received bits can be characterized with probability density functions, as shown. Without knowledge of the neighboring bits, a single probability density function can be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

The above-mentioned problems, in separating the conditional probability density functions of the three bit sequence scenarios, are exasperated when the noise distribution is not symmetric. That is, the energy distributions for "1" bits and "0" bits are different.

FIG. 3 is a diagram illustrating a signal recovered from a binary symmetric, non-dispersive channel in the presence of asymmetric noise (prior art). There are differences in the shapes of the "1" and "0" probability density functions. Because of the overlap of the two functions, the values of thresholds V1' and V0' are not necessarily the same as the values of thresholds V1 and V0 in FIG. 1.

It would be advantageous if inter-symbol interference (ISI) caused by energy dispersion in a received NRZ data channel could be minimized.

It would be advantageous if the bit decision thresholds could be modified to take account of the dispersed energy in the neighboring bits in the NRZ data stream.

It would be advantageous if the above-mentioned inter-symbol interference modifications could also take into account the effects of an asymmetric noise distribution.

SUMMARY OF THE INVENTION

Many communication channels exhibit temporal spreading of the signaling waveform when propagating over long distances or over non-linear media. This phenomenon is not effectively addressed by traditional linear equalization techniques due to the non-causal nature of the impairment. A method is presented to reduce the effects of pulse spreading on hard-decision error rate in communication systems affected by this problem. The method utilizes multiple decision thresholds for each data bit. Post-processing of the multiple decision data is employed to reduce the data to a single hard decision per bit. The multiple data thresholds are adjusted for optimal mitigation of the spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. This calculation is then used to select the threshold most appropriate given the estimated neighbor values. The refined decision is output from the device and fed-forward to be used in processing of subsequent bits. A further analysis is also performed to address the effects of an asymmetric noise distribution. The analysis results in offsets to the decision thresholds that further reduce the number of errors in the bit values.

Accordingly, methods are provided for non-causal channel equalization in a communication system. The method comprises: receiving a non-return to zero (NRZ) data stream input; establishing thresholds to distinguish a first bit estimate; comparing the first bit estimate in the NRZ data stream to a second bit value received prior to the first bit, and a third bit received subsequent to the first bit; in response to the comparisons, determining the value of the first bit; tracking the NRZ data stream inputs in response to sequential bit value combinations; maintaining long-term averages of the tracked NRZ data stream inputs; adjusting the thresholds in response to the long-term averages; and, offsetting the threshold adjustments to account for the asymmetric noise distribution, if any.

More specifically, establishing thresholds to distinguish a first bit estimate includes: establishing a first threshold (V1) to distinguish a high probability "1" first bit estimate; establishing a second threshold (V0) to distinguish a high probability "0" first bit estimate; and, establishing a third threshold (Vopt) to distinguish first bit estimates between the first and second thresholds. Tracking the NRZ data stream inputs in response to sequential bit value combinations includes: tracking the NRZ data stream input voltage when the second bit value equals the third bit value to determine the V1 and V0 thresholds; and, tracking the NRZ data stream mean (average) voltage to determine the Vopt threshold.

Two methods are used to offset the threshold adjustments to account for the asymmetric noise distribution. In the first, the method comprises: following the determination of the first bit values, forward error correction (FEC) decoding the first bit values (this method assumes that the NRZ data stream is FEC encoded); tracking the number of corrections in the first bit when the first bit is determined to be a "1" value; applying an offset to the third threshold (Vopt) to minimize the number of errors when the first bit is determined to be a "1" value; and, applying a proportional offset to the first (V1) and second (V0) thresholds.

In the second method FEC decoding is not required. The method comprises: tracking the ratio of first bit "1" values to first bit "0" values; applying an offset to the third threshold (Vopt) to make the tracked ratio approximately equal to one; and, applying the same offset to the first (V1) and second (V0) thresholds.

Additional details of the above-described method, and a non-causal, asymmetrical noise, channel equalization communication system are provided below.

BRIEF DESCRIPTION OF THE DRAWINGS

FIG. 5 is a graph illustrating the thresholds established by the multi-threshold circuit.

FIGS. 7a and 7b are a schematic block diagram and associated truth table of the non-causal circuit of FIG. 4.

DETAILED DESCRIPTION OF THE PREFERRED EMBODIMENTS

Figure 4:
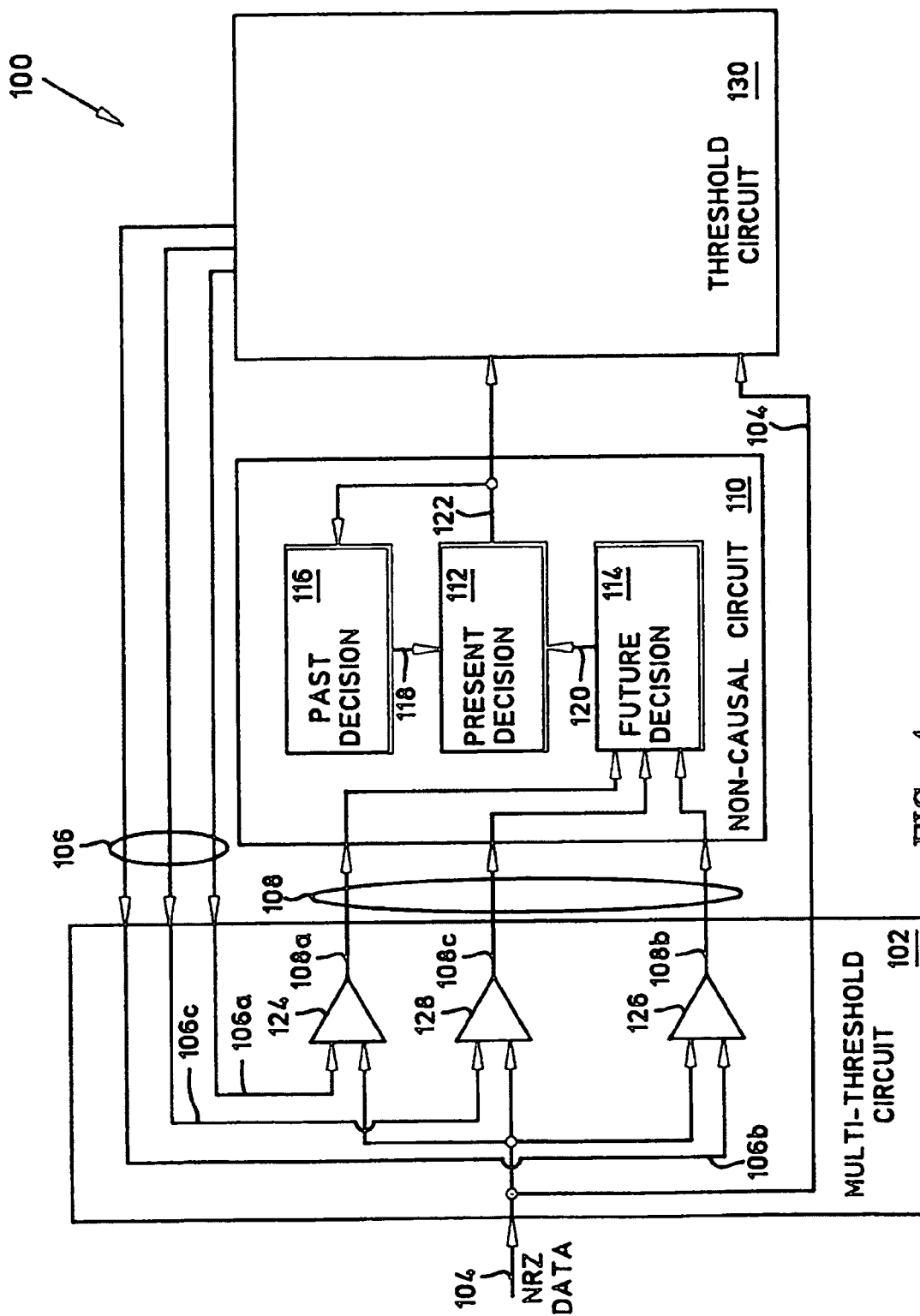
FIG. 4 is a schematic block diagram of the present invention non-causal channel equalization communication system.

FIG. 4 is a schematic block diagram of the present invention non-causal channel equalization communication system. The system 100 is well suited for establishing and maintaining decision thresholds in an symmetrical noise environment. The system 100 comprises a multi-threshold decision circuit 102 having an input on line 104 to accept a non-return to zero (NRZ) data stream, and an input on line 106 to accept threshold values. The multi-threshold decision circuit 102 has outputs on line 108 to provide bit estimates responsive to a plurality of voltage threshold levels. A non-causal circuit 110 has inputs on line 108 to accept the bit estimates from the multi-threshold decision circuit 102. The non-causal circuit 110 compares a current bit estimate (a first bit) to bit values decisions made across a plurality of clock cycles. The non-causal circuit 110 has an output to supply a bit value decision for the current bit estimate determined in response to the non-causal bit value comparisons.

The non-causal circuit 110 includes a present decision circuit 112, a future decision circuit 114, and a past decision circuit 116. The future decision circuit has inputs connected to the mutli-threshold circuit outputs on line 108. The future decision circuit 114 has outputs to supply the first bit estimate and the third bit value (as explained below). The present decision circuit 112 has inputs to accept the first bit estimate, the third bit value, and a second bit value from the past decision circuit 116. The present decision circuit 112 compares the first bit estimate in the data stream to the second bit value received prior to the first bit estimate, represented as being supplied from the past decision circuit 116 on line 118. The present decision circuit 112 also compares the first bit estimate to the third bit value received subsequent to the first bit estimate, represented as being from the future decision circuit 114 on line 120. The present decision circuit 112 has an output on line 122 to supply a first bit value determined in response to comparing the first bit estimates to the second and third bit values.

FIG. 5 is a graph illustrating the thresholds established by the multi-threshold circuit. The following discussion should be considered in light of both FIGS. 4 and 5. The multi-threshold circuit 102 includes a first comparator 124 having an input to accept the NRZ data stream on line 104, an input connected on line 106a to establish a first threshold (V1), and an output on line 108a to supply a signal distinguishing when the NRZ data stream input has a high probability of being a "1" bit value. A second comparator 126 has an input on line 104 to accept the NRZ data stream, an input on line 106b to establish a second threshold (V0), and an output on line 108b to supply a signal distinguishing when NRZ data stream input has a high probability of being a "0" bit value. More literally, the second comparator 126 supplies a "0" when the NRZ data stream input on line 104 has a high probability of being a "0".

A third comparator 128 has an input on line 104 to accept the NRZ data stream, an input on line 106c to establish a third threshold (Vopt), and an output on line 108c to provide a signal when the NRZ data stream input has an approximately equal probability of being a "0" value as a "1" value. Distinguishing between a "1" and a "0" is a process that is performed by the non-causal circuit 110.

A threshold circuit 130 has an input on line 122 to accept bit values from the non-causal circuit 110, an input to accept the NRZ data stream on line 104, and outputs on lines 106a–106c to supply threshold values to the multi-threshold circuit 102. The threshold values are adjusted in response to asymmetric noise in the NRZ data stream. The event of symmetrical noise distribution is a trivial case for the present invention system, in that the added offsets are equal to zero. Alternately stated, the present invention system is able to effectively establish, maintain, and adjust thresholds in both symmetrical and asymmetrical noise environments.

The multi-threshold circuit 102 and the non-causal circuit 110 work together perform a non-causal analysis, regardless of whether the NRZ data stream is FEC encoded. When the multi-threshold circuit 102 receives a NRZ data stream input below the third threshold (Vopt) and above the second threshold (V0), the present decision circuit (of the non-causal circuit 110) responds by supplying a (first) bit value of "1" on line 122, if both the second and third bit values are "0" on lines 118 and line 120, respectively. Otherwise, the present decision circuit 112 supplies a bit value of "0", if only one of the second and third bit values is a "0", or if both the second and third bit values are a "1". When the multi-threshold circuit 102 receives a NRZ data stream input above the third threshold and below the first threshold, the present decision circuit 112 responds by supplying a bit value decision of "0" if both the second and third bit values are "1". The present decision circuit 112 supplies a bit value decision of "1" if only one of the second and third bits is a "1" value, or if both the second and third bit values are a "0".

Figure 6:
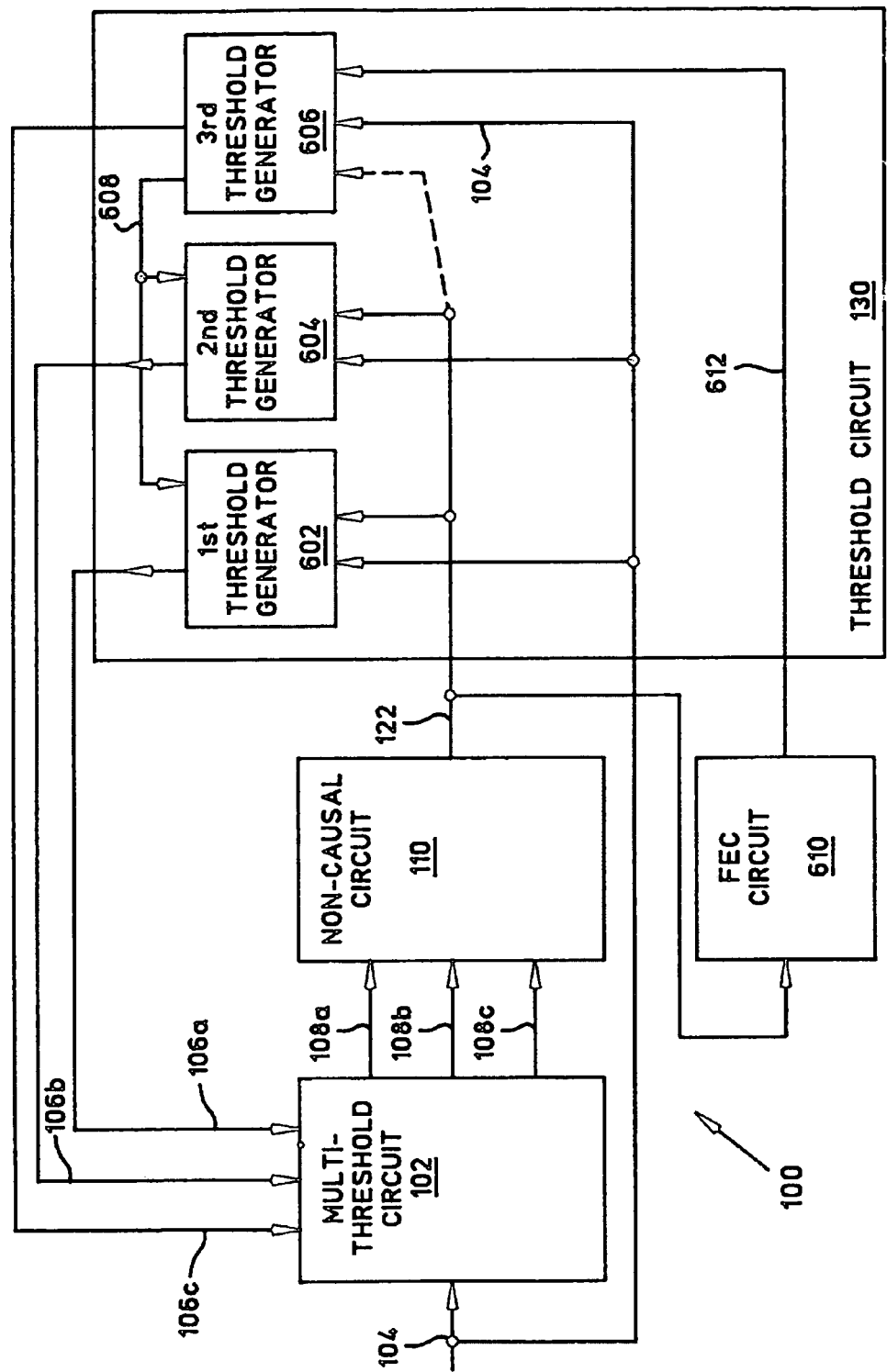
FIG. 6 is a schematic block diagram illustrating the threshold circuit of FIG. 4 in greater detail.

FIG. 6 is a schematic block diagram illustrating the threshold circuit 130 of FIG. 4 in greater detail. Long-term averages are maintained to minimize processing in the determination of the threshold settings. Alternately (but not shown), when the NRZ data stream is FEC encoded, the V1 threshold could be generated by analyzing bit sequences on line 122 when the second and third bit values are "1", comparing the first bit value to the post-FEC corrected bit value, and adjusting the threshold accordingly. However, the averaging method, described below, uses fewer resources. Likewise, the V0 threshold could be generated by analyzing bit sequences on line 122 when the second and third bit values are "0", comparing the first bit value to the post-FEC corrected bit value, and adjusting the threshold accordingly. The Vopt threshold could determined by a simpler analysis of the "1" bit (or "0" bit) corrections, or by an analysis of bit sequences where the second bit value does not equal the third bit value.

A first threshold generator 602 has an input to accept the output of the non-causal circuit (first bit value) on line 122. The first threshold generator 602 also has an input connected on line 104 to accept the NRZ data stream input voltage (or a digital representation of the voltage). The first threshold generator 602 tracks the NRZ data stream input voltage (in the clock period associated with the first bit) when the second and third bit values both equal "1" and maintains a long-term average of the tracked NRZ data stream input voltage. That is, an averaged is maintained of the NRZ data stream voltage when the second and third bit values equal "1". The first threshold generator 602 supplies the first threshold (V1) responsive to the (first) long-term average.

It should be understood that the comparison of any particular set of first bit, second bit, and third bit values at the threshold generators need not necessarily be the same comparison as was previously made by the present decision circuit. This is because the comparison process in the present decision circuit may change the first bit estimate. Likewise, a subsequent analysis of the third bit, when it becomes the first bit estimate, may also result in a change of values. When FEC decoding is used, the first, second, and third bit values may change values yet again, as the FEC decoded corrections are made. Alternately stated, the relationship between the first second, and third bits should be understood to be the comparison of three consecutive bits, whose values may change. This same understanding should also be understood to apply to the second and third threshold generators, presented below.

It should also be understood that the threshold generators would include a delay (not shown) for the voltage level on line 104. The delay is needed to receive the subsequent third bit and to accommodate processing delays before a comparison of the first, second, and third bits. Likewise, the second and third threshold generators would require a delay for the voltage reading on line 104. Alternately but not shown, a single delay circuit could be installed in the signal path to all three threshold generators. In some aspects, the delay is enabled with memory.

A second threshold generator 604 has an input connected to the output of the non-causal circuit 110 on line 122 and an input to accept the NRZ data stream input voltage on line 104. The second threshold generator 604 tracks the NRZ data stream input voltage when the second third bit values both equal "0" and maintains a long-term average of the NRZ data stream input voltage. The average NRZ data stream voltage is kept when the second and third bits have a "0" value. The second threshold generator 604 supplies the second threshold (V0) on line 106b responsive to the (second) long-term average.

The Vopt threshold can be generated through two different measurements of the mean voltage of the NRZ data stream on line 104. A third threshold generator 606 supplies the third threshold (Vopt) at an output on line 106c, in response to the measured average. In the first process, the third threshold generator 606 measures the mean voltage by measuring the NRZ data stream input voltage on line 104 for all bit sequences. The third threshold generator accepts the NRZ data stream input voltage on line 104. The third threshold generator 606 measures the voltage, or a digital representation of the voltage, on the NRZ data stream input. Note, this is a measurement of the NRZ data stream without regard to bit sequences. The third threshold generator 606 supplies the third threshold (Vopt) at an output on line 106c in response to the (third) measured average. The third threshold can be set to the measured average, for example. With pseudorandom scrambling it assumed that the average voltage is a result of an equal number of "0" and "1" bits being received on line 104.

In the second process, the third threshold generator 606 has an input to accept the first bit values from the non-causal circuit 110 on line 122 (shown as a dotted line). The third threshold generator 606 analyzes bit sequences where the second bit value does not equal the third bit value—either "1:X:0" or "0:X:1", where X is the first bit value. At these times, the NRZ data stream input voltage is tracked, and a long-term average of the tracked voltage is maintained. The Vopt threshold on line 106c is derived from this (third) average.

Figure 7A:
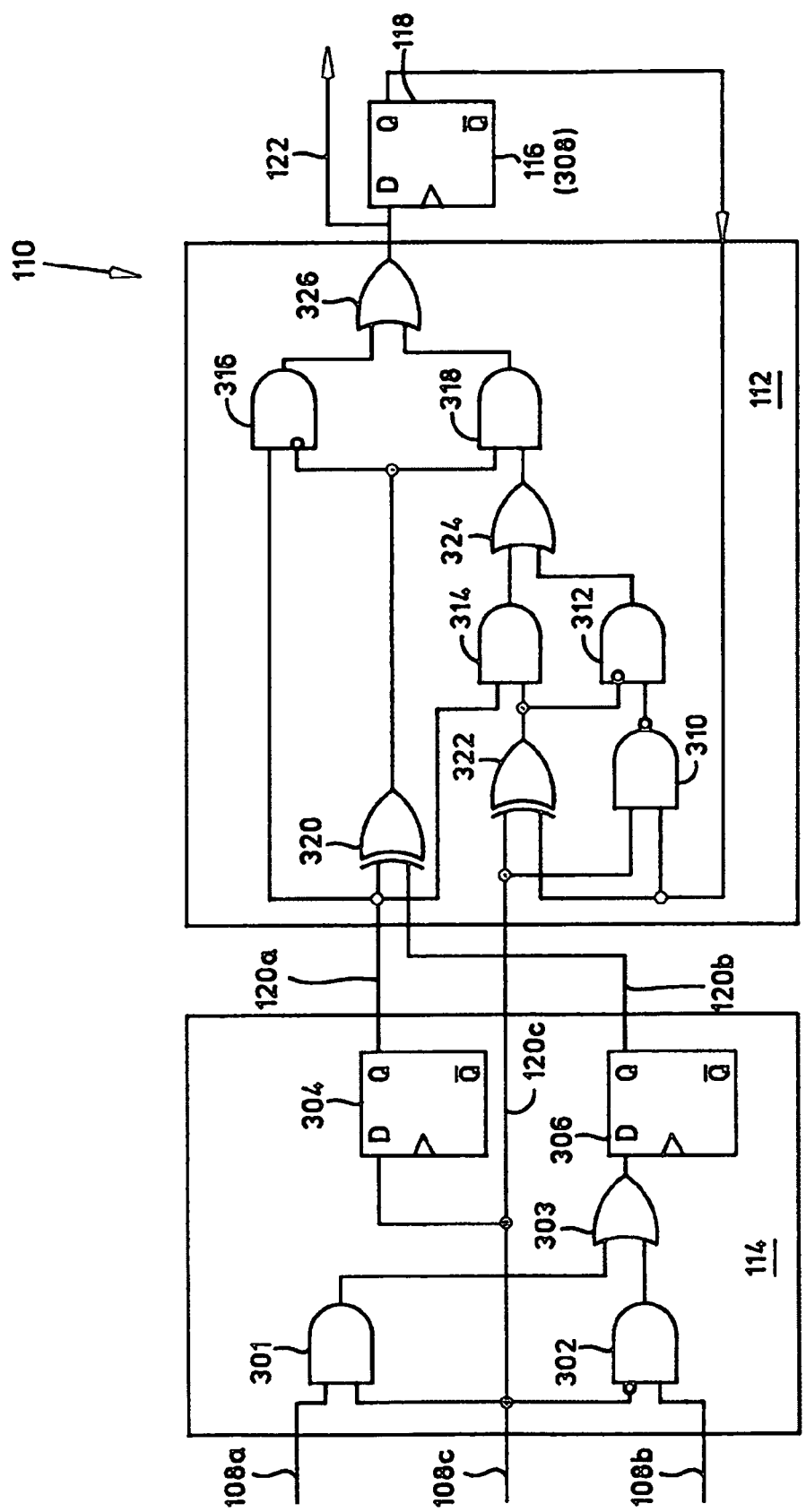
Figure 7B:
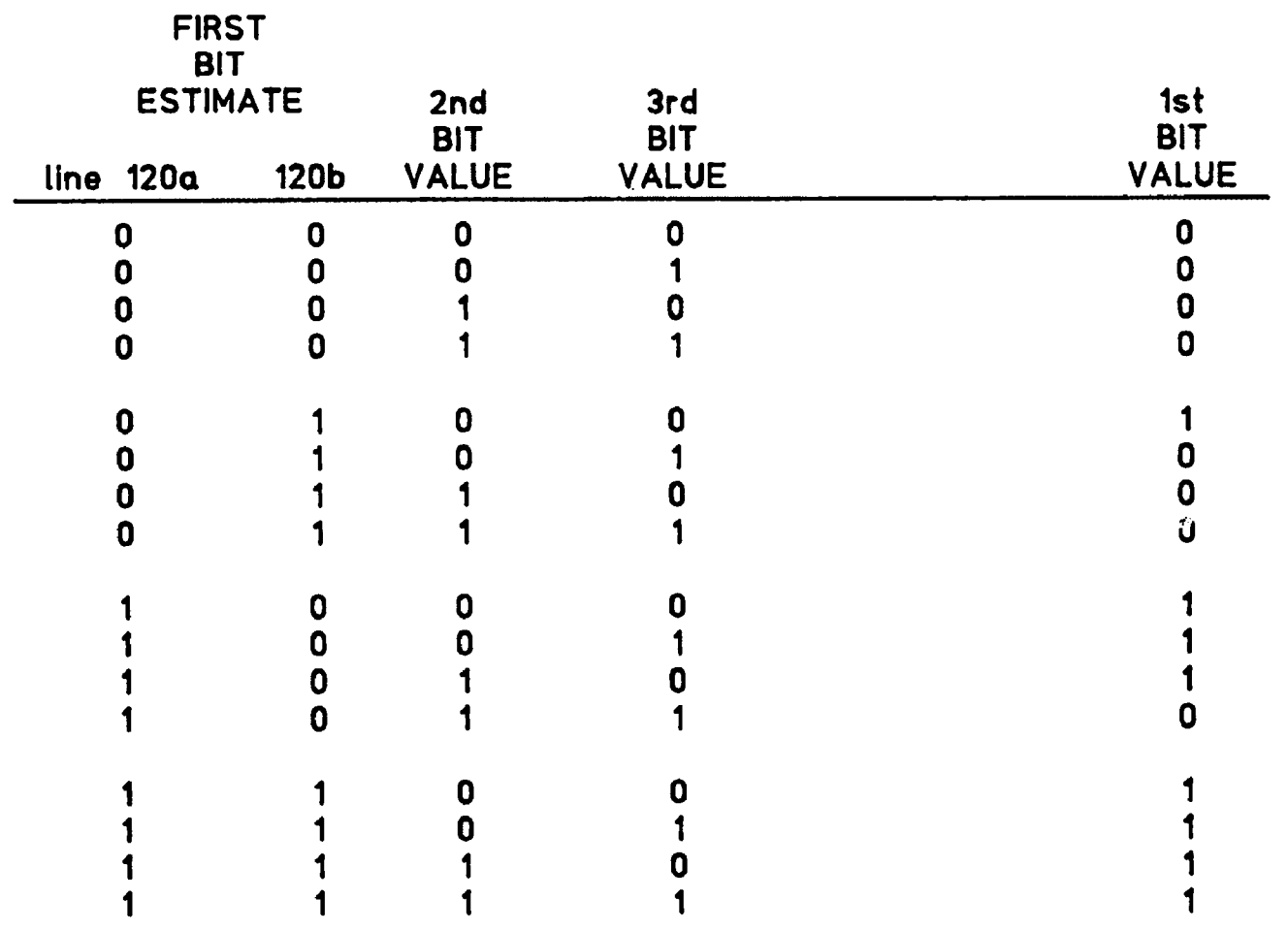

FIGS. 7a and 7b are a schematic block diagram and associated truth table of the non-causal circuit 110 of FIG. 4. FIG. 7a represents only one of many designs that can be used to embody the invention. The future decision circuit 114 has inputs connected to the outputs of the first, second, and third comparators of the multi-threshold circuit on lines 108a, 108b, and 108c, respectively. These three lines correspond to the thresholds shown in FIG. 5. The future decision circuit 114 passes the third comparator signal through on line 120c. This signal is called the third bit value. The future decision circuit 114 performs AND and OR operations using AND circuit 301, AND circuit 302, and OR circuit 303. Delays of one clock cycle are added using flip-flops 304 and 306. When the NRZ data stream input is less than V0, the estimates on line 120a and 120b are "0,0", respectively. When the NRZ data stream input is between Vopt and V0, the estimates on lines 120a and 120b are "0,1", respectively. When the NRZ data stream input is between Vopt and V1, the estimates on lines 120a and 120b are "1,0", respectively. When the NRZ data stream input is above V1, the estimates are lines 120a and 120b are "1,1", respectively. The combination of lines 120a and 120b is called the first bit estimate.

The past decision circuit 116 delays the first bit value on line 122 one clock cycle to supply the second bit value on line 118. Again, a D flip-flop 308 is used for the delay.

The present decision circuit 112 has inputs connected to the future decision circuit outputs to accept the first bit estimate and third bit value on lines 120a, 120b, and 120c, respectively. The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, AND circuits 310 through 318 are employed. Note that AND circuits 316 and 318 have one inverted input and that 310 has an inverted output (NAND). Also used are OR and XOR gates 320 through 326. Again, alternate circuit designs can accomplish the same functions. More important is the relationship between the signal inputs and signal outputs.

FIG. 7b is a truth table illustrating the operation of the present decision circuit 112 of FIG. 7a. The non-causal circuit can be implemented using many different combinations of circuits. More critical is the actual task performed. This task is more clearly defined in light of the truth table diagram.

The first four lines in the table illustrate the case where the NRZ data input, at a clock period associated with a first bit, is below V0. The first bit value is made in comparison to the four different combinations of the second and third bit values. Likewise, the second four lines in the table illustrate the case where the NRZ data input, at a clock period associated with a first bit, is above V0 and below Vopt. The third set of four lines in the table illustrates the case where the NRZ data input is above Vopt, but below V1. The last set of four lines in the table illustrates the case where the NRZ data input is above V1.

The first, second, and third thresholds are adjusted to minimize the number of errors being output by the present decision circuit on line 122. Because the NRZ input is pseudorandomly scrambled, the present decision circuit supplies approximately an equal number of "0" and "1" first bit values in response to establishing the first, second, and third thresholds in the first, second, and third threshold generators, respectively. However, the multi-threshold circuit output need not necessarily supply, nor the present decision circuit input need not necessarily accept an equal number of "0" and "1" bit estimates for this result to occur. The thresholding of the NRZ data input in an asymmetrical noise environment may result in a bias in the ratio between "1s" and "0s". In some aspects of the system, the present decision circuit operates to eliminate this bias.

The threshold values on lines 106a–106c are offset to account for an asymmetric noise distribution using two different processes. Returning to FIG. 6, in the first process the third threshold generator 606 has the input on line 122 (shown as dotted) to accept the output of the non-causal circuit 110. The third threshold generator tracks the ratio of first bit "1" values to first bit "0" values on line 122. Note that although the NRZ data stream voltage on line 104 was used to calculate the pre-offset Vopt value, it is not used in the asymmetric noise analysis to offset the Vopt value. The third threshold generator 606 applies an offset to the third threshold (Vopt) to make the tracked ratio approximately equal to one. The offset value is designated as Vopt'. For example, if there are a larger number of "1" values than "0" values, the offset is used to raise the Vopt threshold value until the average number of "1" and "0" values are approximately equal. Again, this analysis assumes pseudorandom bit scrambling.

The third threshold generator 606 has an output on line 608 to supply the offset to the other threshold generators 602 and 604. The first threshold generator 602 has an input on line 608 to accept the offset, and in response to receiving the offset, supplies an offset first threshold value. That is, the offset is added to the first threshold value (V1) on line 106a. The offset V1 value is designated V1'. Likewise, the second threshold generator 604 has an input on line 608 to accept the offset, and in response to receiving the offset, supplies an offset second threshold value (V0) on line 106b. The offset V0 value is designated V0'. The offset supplied to the first and second threshold generators 602 and 604 is proportional to the third threshold offset. In some aspects, the offset supplied to the first and second threshold generators 602 and 604 is the same as the third threshold offset, so that the three thresholds move in lockstep.

Alternately, the first and second threshold generators 602 and 604 can perform their own offset analysis. The first threshold generator 602 can offset the V1 value to obtain an equal number of "1" and "0" values when the second and third bits are "1" values. Likewise, the second threshold generator 604 can offset the V0 value to obtain an equal number of "1" and "0" values when the second and third bits are "0" values. However, this independent offset analysis process may use a greater number of system resources.

The second process for performing the asymmetric noise analysis assumes that the multi-threshold circuit 102 accepts an NRZ data stream encoded with forward error correction. Then, the system 100 further comprises a forward error correction (FEC) circuit 610 having an input on line 122 to receive the first bit value from the non-causal circuit 110. The FEC circuit 610 decodes the incoming data stream on line 122 and corrects bit values in response to the decoding. The FEC circuit 610 has an output on line 612 to supply a stream of corrected data bits.

The third threshold generator 606 has an input to accept the stream of corrected bits from the FEC circuit 610 on line 612. The third threshold generator 606 offsets the third threshold (Vopt) in response to comparing the first bit values to corresponding corrected bit values. That is, the third threshold generator 606 modifies the offset to minimize the number of errors in the first bit values on line 122. In some aspects, the offset is set to balance the number of "1" and "0" errors. The third threshold generator 606 tracks the number of corrections in the first bit when the first bit is determined to be a "1" value and offsets the third threshold (Vopt) to minimize the number of corrections. Alternately, the number of "0" value corrections could be analyzed. As above, the offset is supplied to the second and third threshold generators 602 and 604 on line 608. The offset supplied to the second and third generators 602 and 604 can be proportional to the offset applied to the third threshold. Note that the offsets supplied to the second and third generators 602 and 604 are not necessarily identical. In some aspects of the system, the offsets supplied to the second and third generators 602 and 604 are the same as the offset applied to the third threshold.

Again, the first and second threshold generators 602 and 604 can perform their own offset analysis, instead of using the offset value provided on line 608. Instead, the first and second threshold generators 602 and 604 would have inputs from the FEC circuit 610 on line 612 (not shown). The first threshold generator 602 would offset the V1 value to minimize the number of FEC corrections required when the second and third bits are "1" values. Likewise, the second threshold generator 604 would offset the V0 value to minimize the number of FEC corrections when the second and third bits are "0" values. However, this independent offset analysis process may use a greater number of system resources.

Functional Description

Returning to FIG. 4, in some aspects of the system 100, the communications are received in a modulation format different than NRZ, and then converted to NRZ format. The NRZ input signal can also be buffered (not shown). The NRZ data signal is provided to the multiple threshold comparators 124 through 126. In some aspects of the system 100 circuits, not shown, a timing recovery circuit is used at the output of the comparators on lines 108a through 108c. The timing recovery circuit generates a clock and sample signal from the received data. The sample signal is synchronized to the center of the data bit. In this implementation, a method for offsetting the sample point is provided to compensate device or channel specific anomalies.

The non-causal circuit 110 is used as a high performance decision device prior to FEC decoding in the system 100. FEC decoding can also be used as additional information to improve the estimates made by the non-causal circuit 110 as a by-product of the error correction procedure. This information can be processed and used to optimize the decision points of multi-threshold circuit 102. Error rate information on the relative probability of a ones ("1s") error vs. a zeros ("0s") error is collected for the four cases of the probability density function (PDF). Specifically:

| | |
|---|---|
| PDF 1) | P(errorred one \| no neighboring 1s) |
| | P(errorred zero \| no neighboring 1s) |
| PDF 2) | P(errorred one \| preceding neighbor 1) |
| | P(errorred zero \| preceding neighbor 1) |
| PDF 3) | P(errorred one \| following neighbor 1) |
| | P(errorred zero \| following neighbor 1) |
| PDF 4) | P(errorred one \| two neighboring 1s) |
| | P(errorred zero \| two neighboring 1s) |

Since most FEC encoded systems are also scrambled to insure a 50% mark ratio, statistical data for each of the three cases can be reduced to a ratio. Each threshold can be adjusted to achieve the ones/zero ratio that provides the best fit for the channel in use. In many cases this will be ~50%. For cases in which dispersion is symmetric, PDF 2 and PDF 3 are combined to a single statistic.

Figure 1:
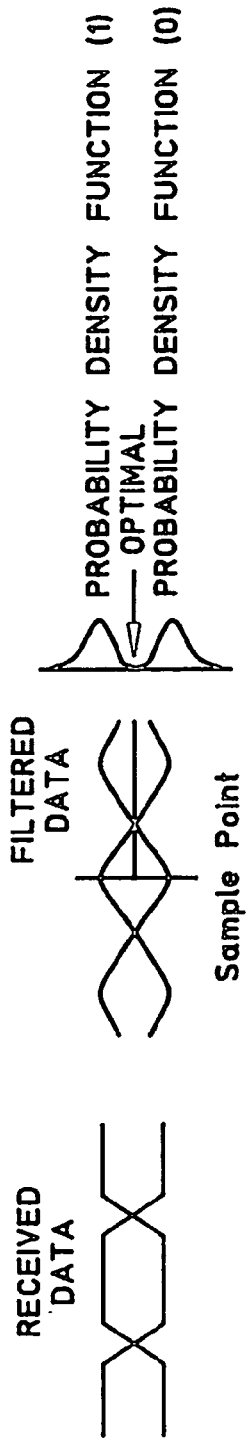
FIG. 1 is a diagram illustrating a signal recovered from a binary symmetric, non-dispersive channel in the presence of symmetric noise (prior art).
Figure 2:
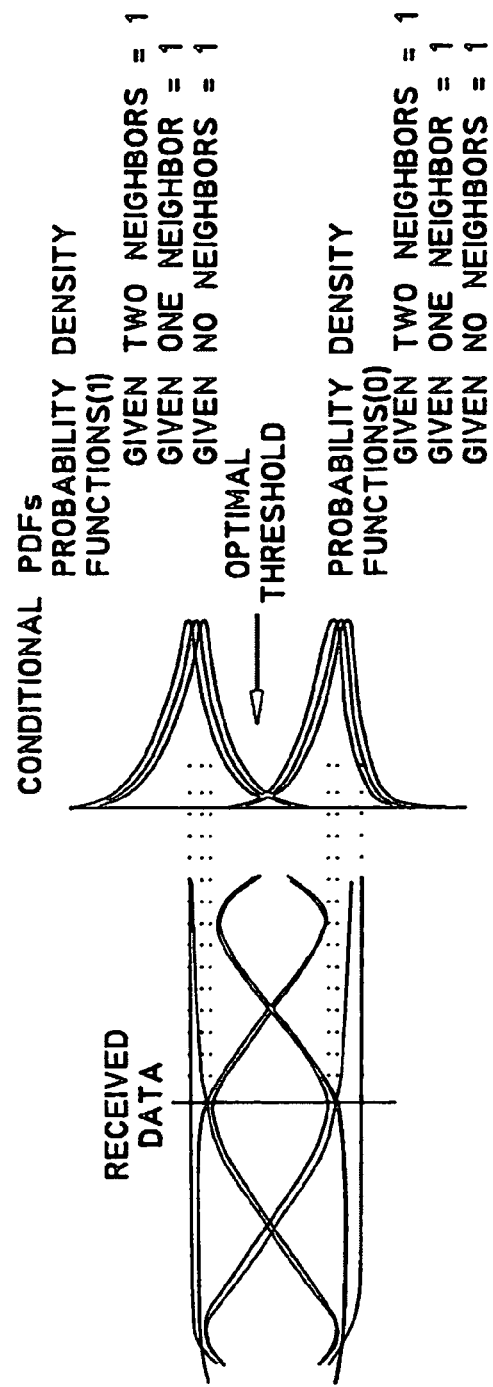
FIG. 2 is a diagram illustrating received waveforms that are distorted in response to the inter-symbol interference resulting from energy dispersion (prior art).
Figure 3:
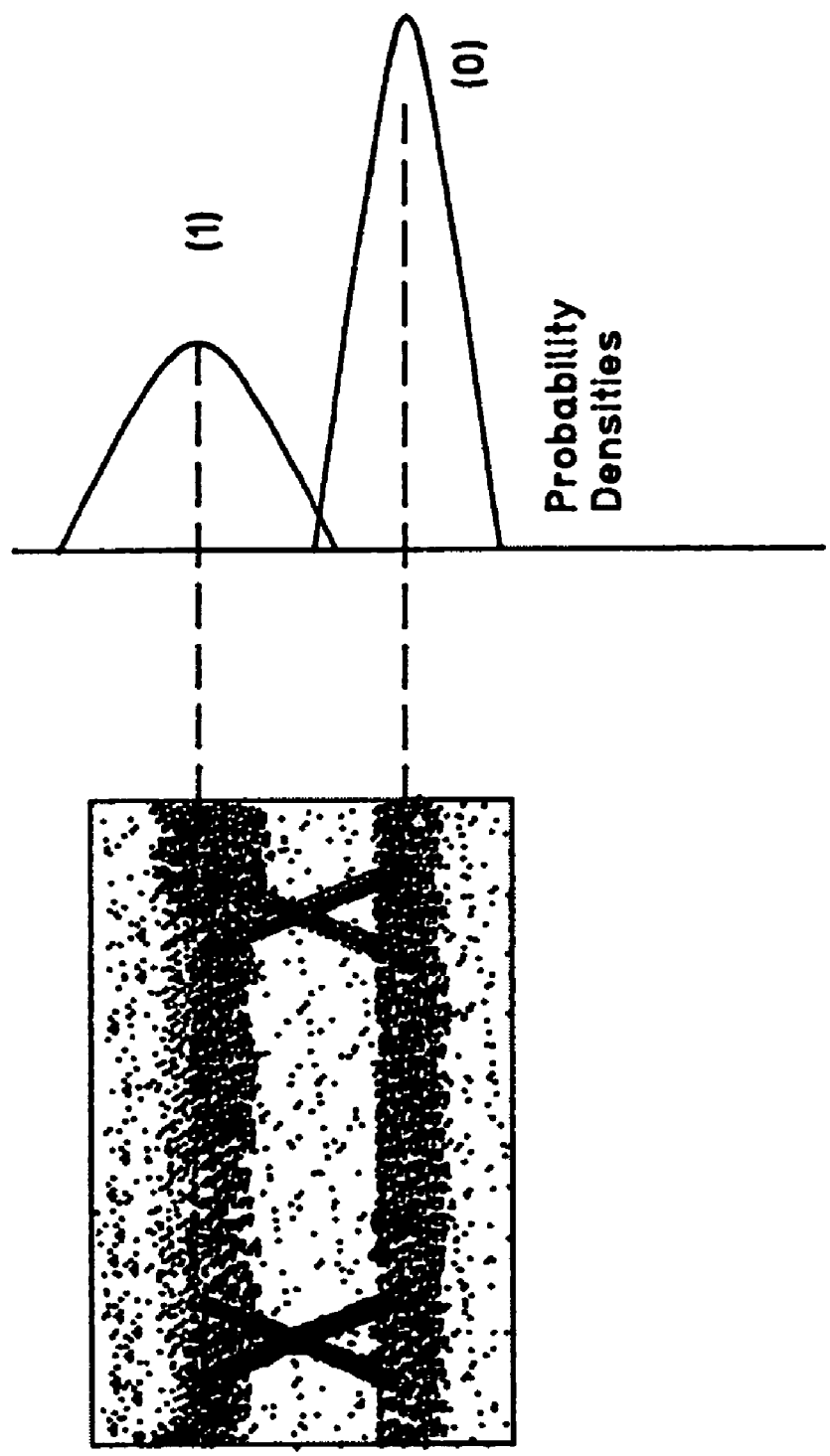
FIG. 3 is a diagram illustrating a signal recovered from a binary symmetric, non-dispersive channel in the presence of asymmetric noise (prior art).
Figure 8:
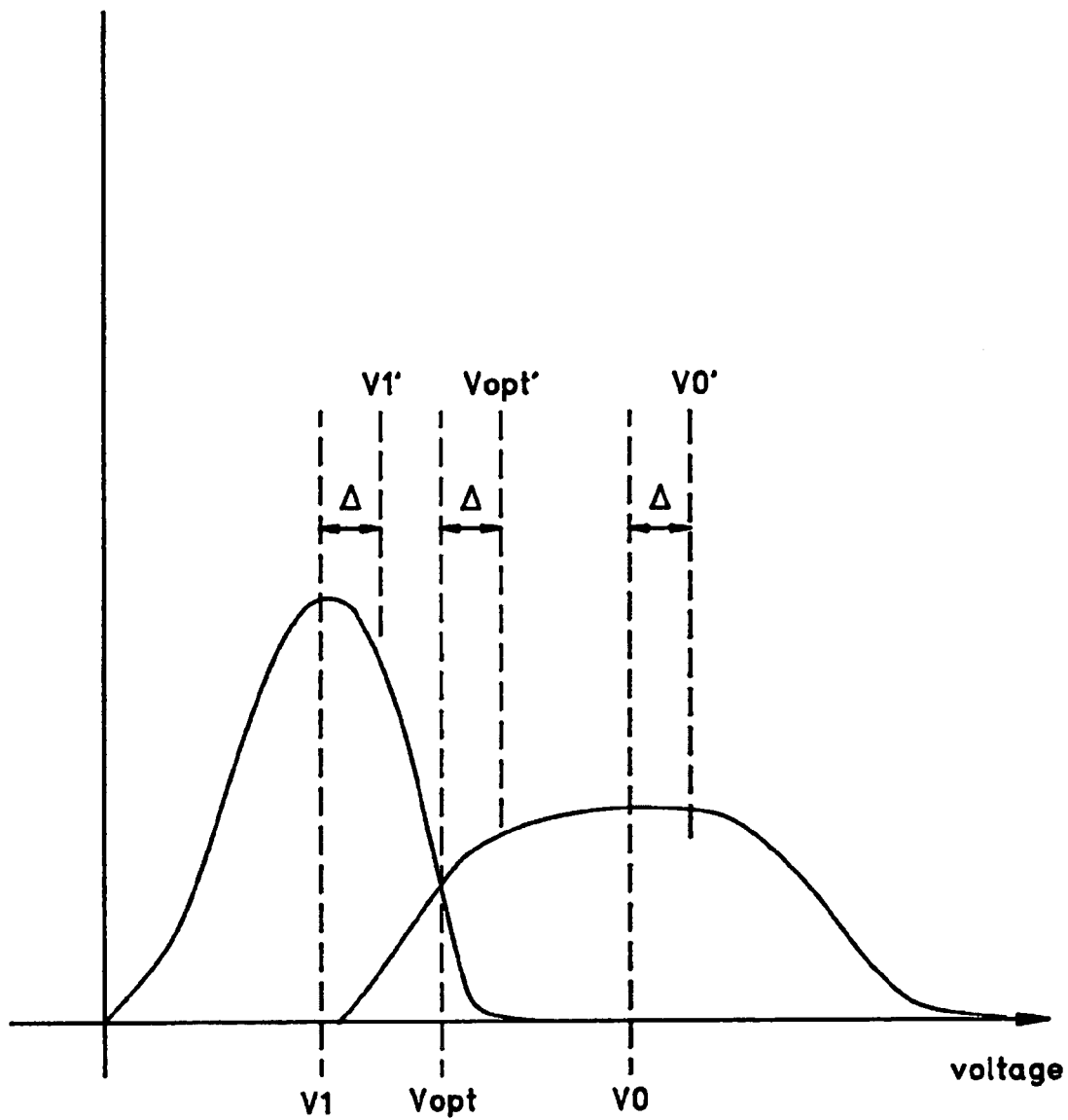
FIG. 8 is a diagram illustrating the application of threshold offsets to the asymmetric noise distribution probability density functions of FIG. 3.

FIG. 8 is a diagram illustrating the application of threshold offsets to the asymmetric noise distribution probability density functions of FIG. 3. Shown are the thresholds V1, V0, and Vopt. As described above, these thresholds are determined through an analysis of the NRZ data stream input average voltage, in response to specific bit sequences. When, the noise distribution is symmetric, the thresholds should yield accurate bit decisions (the offsets will be equal to zero). However, offsets (Δ) need to be applied when the noise distribution is asymmetrical. The offsets as well as the offset thresholds V1', V0', and Vopt' are shown.

Figure 9A:
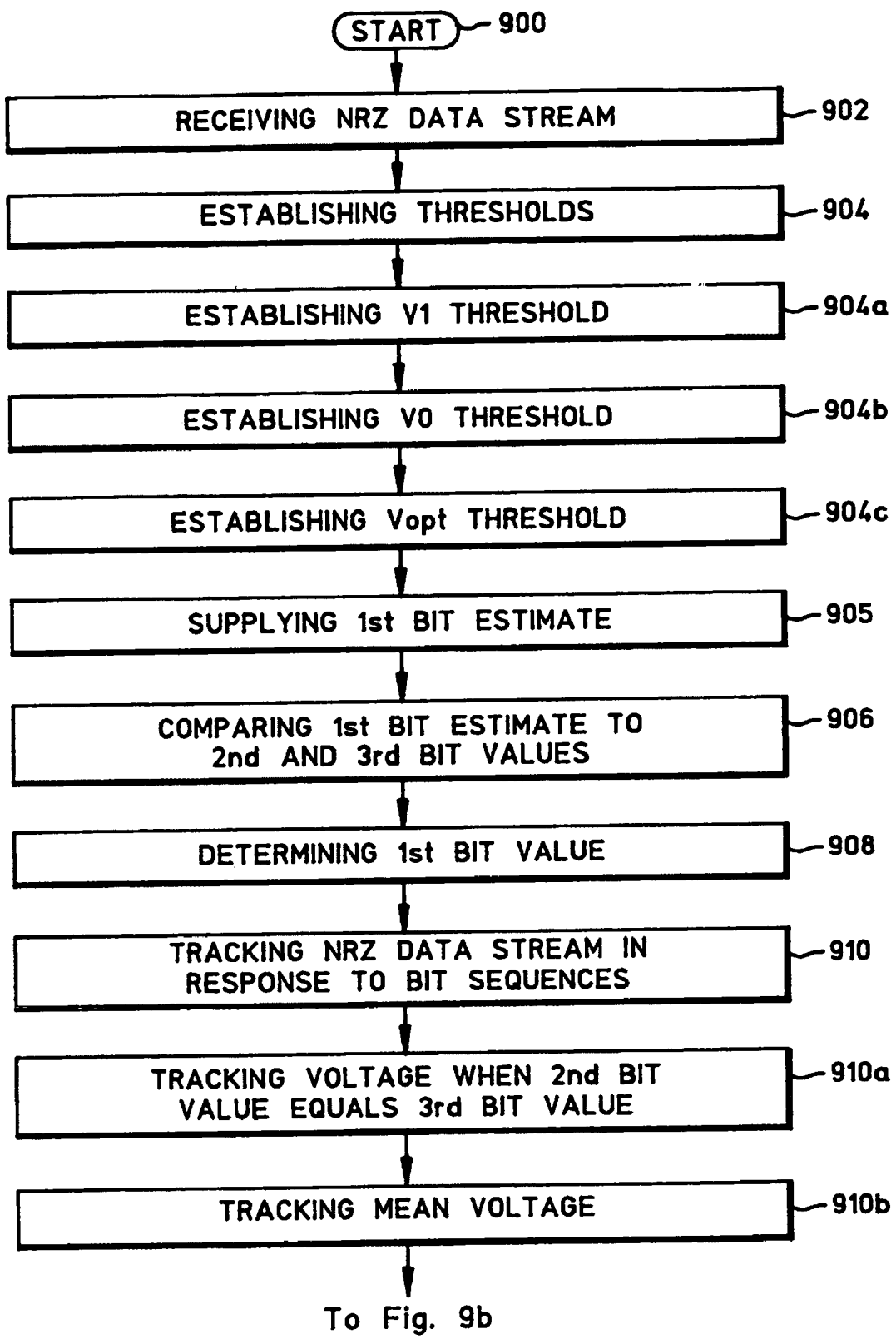
FIGS. 9a and 9b are flowcharts illustrating the present invention methods for non-causal channel equalization in a communications system.
Figure 9B:
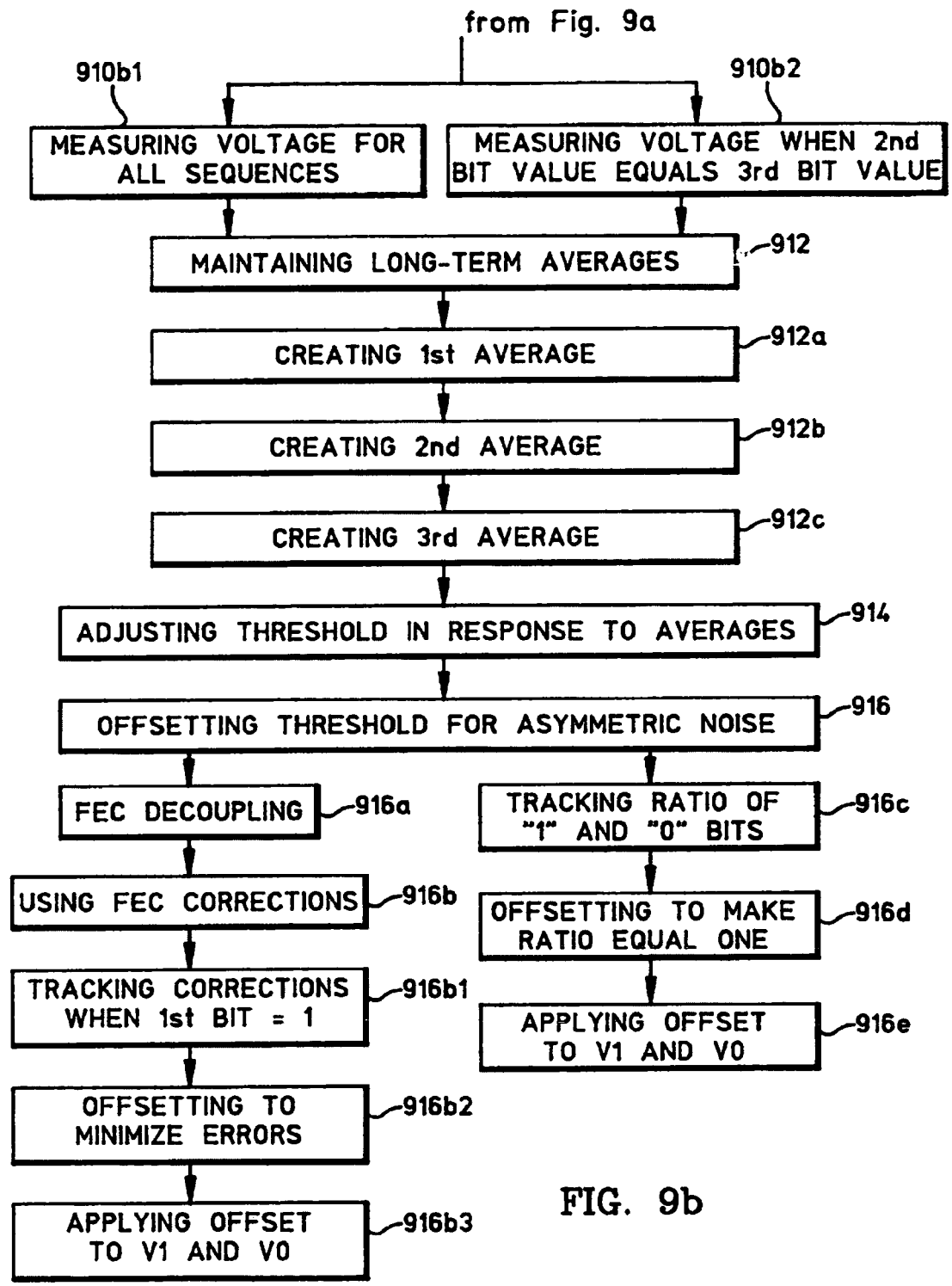

FIGS. 9a and 9b are flowcharts illustrating the present invention methods for non-causal channel equalization in a communications system. These methods generally correspond to FIGS. 4 and 6. Although the methods are depicted as a sequence of numbered steps for clarity, no order should be inferred from the numbering unless explicitly stated. It should be understood that some of these steps may be skipped, performed in parallel, or performed without the requirement of maintaining a strict order of sequence. The methods start at Step 900. Step 902 receives a non-return to zero (NRZ) data stream input. As mentioned above, the present invention method applies equally well to asymmetrical and symmetrical noise distribution, and it is assumed herein that symmetrical noise is a trivial case of asymmetrical noise. Step 904 establishes thresholds to distinguish a first bit estimate. Step 906 compares the first bit estimate in the NRZ data stream to a second bit value received prior to the first bit, and a third bit received subsequent to the first bit. Step 908, in response to the comparisons, determines the value of the first bit. Step 910 tracks the NRZ data stream inputs in response to sequential bit value combinations. Step 912 maintains long-term averages of the tracked NRZ data stream inputs. Step 914 adjusts the thresholds in response to the long-term averages. Step 916 offsets the threshold adjustments to account for the asymmetric noise distribution.

Tracking the NRZ data stream inputs in response to sequential bit value combinations (Step 910) includes substeps. Step 910a tracks the NRZ data stream input voltage when the second bit value equals the third bit value. Step 910b tracks the NRZ data stream mean voltage. In some aspects of the method, Step 910b1 measures the NRZ data stream input voltage for all bit sequences. Alternately, Step 910b2 measures the NRZ data stream input voltage when the second bit value does not equal the third bit value.

Establishing thresholds to distinguish a first bit estimate in Step 904 includes substeps. Step 904a establishes a first threshold (V1) to distinguish a high probability "1" first bit estimate. Step 904b establishes a second threshold (V0) to distinguish a high probability "0" first bit estimate. Step 904c establishes a third threshold (Vopt) to distinguish first bit estimates between the first and second thresholds. Then, Step 905 supplies the first bit estimate for comparison in response to distinguishing the NRZ data stream input at the first, second, and third thresholds.

Establishing a third threshold (Vopt) to distinguish first bit estimates between the first and second thresholds in Step 904c includes additional substeps (not shown). Step 904c1 distinguishes NRZ data stream inputs below first threshold and above the third threshold as a "0" if both the second and third bits are "1" values, as a "1" if only one of the second and third bits is a "1" value, and as "1" if both the second and third bits are a "0" value. Step 904c2 distinguishes NRZ data stream inputs above the second threshold and below the third threshold as a "1" if both the second and third bits are a "0" value, as a "0" if only one of the second and third values is a "0" value, and as a "0" if both the second and third bits are a "1" value.

Tracking the NRZ data stream input voltage when the second bit value equals the third bit value in Step 910a includes substeps (not shown). Step 910a1 tracks the NRZ data stream input voltage when the second and third bits both have "1" values. Step 910a2 tracks the NRZ data stream input voltage the second and third bits have "0" values.

Maintaining long-term averages of the NRZ data stream inputs in Step 912 includes substeps. Step 912a creates a first average of the NRZ data stream input voltage when the second and third bits are both "1" values. Step 912b creates a second average of the NRZ data stream input voltage when the second and third bits are both "0" values. Step 912c creates a third average of the NRZ data stream input mean voltage.

Adjusting the thresholds in response to the long-term averages in Step 914 includes substeps (not shown). Step 914a adjusts the first threshold (V1) in response to the first average. Step 914b adjusts the second threshold (V0) in response to the second average. Step 914c adjusts the third threshold (Vopt) in response to the third average. In other aspects of the method, the first and second thresholds are adjusted in Steps 914a and 914b in response to the third threshold adjustment in Step 914c. Then, the offsets applied to the first and second thresholds are proportional to the offset applied to the third threshold. In some aspects, the first and second threshold offsets are the same (equal to) to the third threshold offset.

In some aspects of the method, receiving a non-return to zero data stream in Step 902 includes receiving a non-return to zero data stream encoded with forward error correction (FEC). Then, offsetting the threshold adjustments to account for the asymmetric noise distribution includes substeps. Step 916a, following the determination of the first bit values, FEC decodes the first bit values. Step 916b uses the FEC corrections of the first bit values to offset the first, second, and third threshold values.

In some aspects, using the FEC corrections of the first bit values to offset the first, second, and third threshold values in Step 916b includes substeps. Step 916b1 tracks the number of corrections in the first bit when the first bit is determined to be a "1" value. Alternately, the number of "0" value corrections could be tracked. Step 916b2 applies an offset to the third threshold (Vopt) to minimize the number of errors when the first bit is determined to be a "1" value. Step 916b3 applies an offset to the first (V1) and second (V0) thresholds that is proportional to the offset applied to the third threshold (Vopt). The offsets applied to the first and second thresholds are not necessarily the same. In some aspects of the method, the offsets applied to the first and second thresholds are the same as the offset applied to the third threshold.

In other aspects, offsetting the threshold adjustments to account for the asymmetric noise distribution in Step 916 includes alternate substeps. Step 916c tracks the ratio of first bit "1" values to first-bit "0" values. Step 916d applies an offset to the third threshold (Vopt) to make the tracked ratio approximately equal to one. Step 916e applies the same offset to the first (V1) and second (V0) thresholds. Note that the method of Step 916c through 916e may also be employed when the NRZ data stream is FEC encoded.

A system and method have been provided for non-causally adjusting a NRZ data stream with an asymmetric noise distribution. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using one than one preceding or subsequent bit value. Some simple algorithms have been presented to modify the bit decisions in the presence of asymmetric noise. More complicated algorithms can also be used to potentially improve the accuracy. It should also be understood that the concepts introduced in this disclosure for non-causal channel equalization can be more generally applied to any form of communications or modulation where inter-symbol interference can occur. Examples have been given of an NRZ modulation protocol, however, the principles of the present invention can be applied to other protocols where ISI is an issue. Examples have also been given of a three-threshold decision system. Once again, the principles of the present invention can be applied to systems using a different number of decision thresholds. Also, examples of the three-bit (future/present/past) non-causal decision circuit have been given. The present invention could also be applicable to a non-causal circuit that evaluates longer sequences of bit decision. Other variations and embodiments of the invention will occur to those skilled in the art.

We claim:

1. A non-causal channel equalization communication system, the system comprising:
   a multi-threshold decision circuit having an input to accept a non-return to zero (NRZ) data stream, an input to accept threshold values, and outputs to provide bit estimates responsive to a plurality of voltage threshold levels;
   a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons;
   a threshold circuit having an input to accept bit values from the non-causal circuit, an input to accept the NRZ data stream, and outputs to supply threshold values to the multi-threshold circuit that are adjusted in response to asymmetric noise in the NRZ data stream; and,
   wherein the non-causal circuit includes:
      a future decision circuit having inputs connected to the mutli-threshold circuit outputs, the future decision circuit having outputs to supply the current, first bit, estimate and a third bit value;
      a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply the first bit value determined in response to comparing the first bit estimates to the second and third bit values; and,
      a past decision circuit having an input to accept the first bit value and an output to supply the second bit value.

2. The system of claim 1 wherein the multi-threshold circuit includes:
   a first comparator having an input to accept the NRZ data stream, an input establishing a first threshold (V1), and an output to supply a signal distinguishing when the NRZ data stream input has a high probability of being a "1" bit value;

a second comparator having an input to accept the NRZ data stream, an input establishing a second threshold (V0), and an output to supply a signal distinguishing when the NRZ data stream input has a high probability of being a "0" bit value; and, a third comparator having an input to accept the NRZ data stream, an input establishing a third threshold (Vopt), and an output to provide a signal when the NRZ data stream input has an approximately equal probability of being a "0" value as a "1" value.

3. The system of claim 2 wherein the future decision circuit supplies a first bit estimate for an NRZ data stream input below the third threshold and above the second threshold;

wherein the present decision circuit, in response, supplies:

a first bit value of "1" when both the second and third bit value are "0" values;

a first bit value of "0" when only one of the second and third bit values is a "0" value; and, a first bit value of "0" when both the second and third bit values are a "1".

4. The system of claim 3 wherein the future decision circuit supplies a first bit estimate for an NRZ data stream input above the third threshold and below the first threshold;

wherein the present decision circuit, in response, supplies:

a first bit value of "0" when both the second and third bit value are "1" values;

a first bit value of "1" when only one of the second and third bit values is a "1" value; and, a first bit value of "1" when both the second and third bit values are a "0".

5. The system of claim 4 wherein the threshold circuit includes:

a first threshold generator having an input connected to the output of the non-causal circuit and an input to accept the NRZ data stream, the first threshold generator tracking the NRZ data stream input voltage when the second and third bit values both equal "1" and maintaining a long-term average of the tracked NRZ data stream input voltage, the first threshold generator having an output to supply the first threshold (V1) responsive to the long-term average.

6. The system of claim 5 wherein the threshold circuit includes:

a second threshold generator having an input connected to the output of the non-causal circuit and an input to accept the NRZ data stream input, the second threshold generator tracking the NRZ data stream input voltage when the second and third bit values both equal "0" and maintaining a long-term average of the NRZ data stream input voltage, the second threshold generator having an output to supply the second threshold (V0) responsive to the long-term average.

7. The system of claim 6 wherein the threshold circuit includes:

a third threshold generator having an input to accept the NRZ data stream input, the third threshold generator measuring a mean voltage of the NRZ data stream and supplying the third threshold (Vopt) at an output in response to the measured average.

8. The system of claim 7 wherein the third threshold generator measures the mean voltage by measuring the NRZ data stream input voltage for all bit sequences.

9. The system of claim 7 wherein the third threshold generator has an input to accept the output of the non-causal circuit, and wherein the third threshold generator measures the mean voltage by measuring the NRZ data stream input voltage when the second bit value does not equal the third bit value.

10. The system of claim 7 wherein the multi-threshold circuit accepts an NRZ data stream encoded with forward error correction (FEC); and, the system further comprising:

a forward error correction (FEC) circuit having an input to receive the first bit value from the non-causal circuit, the FEC circuit decoding the incoming data stream and correcting bit values in response to the decoding, the FEC circuit having an output to supply a stream of corrected data bits; and, wherein the third threshold generator has an input to accept the stream of corrected bits from the FEC circuit, the third threshold generator offsetting the third threshold (Vopt) in response to comparing the first bit values to corresponding corrected bit values.

11. The system of claim 10 wherein the third threshold generator tracks the number of corrections in the first bit when the first bit is determined to be a "1" value and offsets the third threshold (Vopt) to minimize the number of corrections.

12. The system of claim 11 wherein the third threshold generator has an output to supply offsets proportional to the offset applied to the third threshold;

wherein the first threshold generator has an input to accept the offset from the third threshold generator, and in response supplies an offset first threshold value; and, wherein the second threshold generator has an input to accept the offset from the third threshold generator, and in response supplies an offset second threshold value.

13. The system of claim 12 wherein the third threshold generator supplies offsets equal to the offset applied to the third threshold.

14. The system of 7 wherein the third threshold generator has an input to accept the output of the non-causal circuit, and wherein the third threshold generator tracks a ratio of first bit "1" values to first bit "0" values and applies an offset to the third threshold (Vopt) to make the tracked ratio approximately equal to one.

15. The system of claim 14 wherein the third threshold generator has an output to supply the offset;

wherein the first threshold generator has an input to accept the offset, and in response supplies an offset first threshold value; and, wherein the second threshold generator has an input to accept the offset, and in response supplies an offset second threshold value.

16. The system of claim 2 wherein the present decision circuit supplies approximately an equal number of "0" and "1" first bit values in response to establishing the first, second, and third thresholds in the first, second, and third threshold generators, respectively.

17. A non-causal channel equalization communication system, the system comprising:

a multi-threshold decision circuit having an input to accept a serial data stream, an input to accept threshold values, and outputs to provide bit estimates responsive to a plurality of voltage threshold levels;

a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons;

a threshold circuit having an input to accept bit values from the non-causal circuit, an input to accept the serial data stream, and outputs to supply threshold values to the multi-threshold circuit that are adjusted in response to asymmetric noise in the serial data stream; and, wherein the non-causal circuit includes:

a future decision circuit having inputs connected to the mutli-threshold circuit outputs, the future decision circuit having outputs to supply the current, first bit, estimate and a third bit value;

a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply the first bit value determined in response to comparing the first bit estimates to the second and third bit values; and, a past decision circuit having an input to accept the first bit value and an output to supply the second bit value.

18. The system of claim 17 wherein the multi-threshold circuit includes:

a first comparator having an input to accept the serial data stream, an input establishing a first threshold (V1), and an output to supply a signal distinguishing when the serial data stream input has a high probability of being a "1" bit value;

a second comparator having an input to accept the serial data stream, an input establishing a second threshold (V0), and an output to supply a signal distinguishing when the serial data stream input has a high probability of being a "0" bit value; and, a third comparator having an input to accept the serial data stream, an input establishing a third threshold (Vopt), and an output to provide a signal when the serial data stream input has an approximately equal probability of being a "0" value as a "1" value.

19. The system of claim 18 wherein the future decision circuit supplies a first bit estimate for a serial data stream input below the third threshold and above the second threshold;

wherein the present decision circuit, in response, supplies:

a first bit value of "1" when both the second and third bit value are "0" values;

a first bit value of "0" when only one of the second and third bit values is a "0" value; and, a first bit value of "0" when both the second and third bit values are a "1".

20. The system of claim 19 wherein the future decision circuit supplies a first bit estimate for a serial data stream input above the third threshold and below the first threshold;

wherein the present decision circuit, in response, supplies:

a first bit value of "0" when both the second and third bit value are "1" values;

a first bit value of "1" when only one of the second and third bit values is a "1" value; and, a first bit value of "1" when both the second and third bit values are a "0".

21. The system of claim 20 wherein the threshold circuit includes:

a first threshold generator having an input connected to the output of the non-causal circuit and an input to accept the serial data stream, the first threshold generator tracking the serial data stream input voltage when the second and third bit values both equal "1" and maintaining a long-term average of the tracked serial data stream input voltage, the first threshold generator having an output to supply the first threshold (V1) responsive to the long-term average;

a second threshold generator having an input connected to the output of the non-causal circuit and an input to accept the serial data stream input, the second threshold generator tracking the serial data stream input voltage when the second and third bit values both equal "0" and maintaining a long-term average of the serial data stream input voltage, the second threshold generator having an output to supply the second threshold (V0) responsive to the long-term average; and, a third threshold generator having an input to accept the serial data stream input, the third threshold generator measuring a mean voltage of the serial data stream and supplying the third threshold (Vopt) at an output in response to the measured average.

22. The system of claim 21 wherein the multi-threshold circuit accepts a serial data stream encoded with forward error correction (FEC); and, the system further comprising:

a forward error correction (FEC) circuit having an input to receive the first bit value from the non-causal circuit, the FEC circuit decoding the incoming data stream and correcting bit values in response to the decoding, the FEC circuit having an output to supply a stream of corrected data bits; and, wherein the third threshold generator has an input to accept the stream of corrected bits from the FEC circuit, the third threshold generator offsetting the third threshold (Vopt) in response to comparing the first bit values to corresponding corrected bit values.

23. A non-causal channel equalization communication system, the system comprising:

a multi-threshold decision circuit having an input to accept a serial data stream, an input to accept threshold values, and outputs to provide a plurality of bit estimates responsive to a plurality of voltage threshold levels;

a non-causal circuit having inputs to accept the bit estimates from the multi-threshold decision circuit and an output to supply a first bit value for a current clock cycle in response to comparing a first bit estimate for the current clock cycle to bit values determined in non-current clock cycles;

a threshold circuit having an input to accept the first bit values from the non-causal circuit, an input to accept the serial data stream, and outputs to supply threshold values to the multi-threshold circuit that are adjusted in response to asymmetric noise in the serial data stream; and, wherein the non-causal circuit includes:

a future decision circuit having inputs connected to the mutli-threshold circuit outputs, the future decision circuit having outputs to supply the first bit estimate and a third bit value;

a present decision circuit having inputs to accept the first bit estimates, third bit values, and a second bit value, the present decision circuit comparing the first bit estimate to both the second bit value, determined for a clock cycle prior to the current clock cycle, and the third bit value, determined for a clock cycle subsequent to the current clock cycle, the present decision circuit having an output to supply the first bit value determined in response to comparing the first bit estimate to the second and third bit values; and, a past decision circuit having an input to accept the first bit value and an output to supply the second bit value.

24. The system of claim 23 wherein the multi-threshold circuit includes:
   a first comparator having an input to accept the serial data stream, an input establishing a first threshold (V1), and an output to supply a signal distinguishing when the serial data stream input has a high probability of being a "1" bit value;
   a second comparator having an input to accept the serial data stream, an input establishing a second threshold (V0), and an output to supply a signal distinguishing when the serial data stream input has a high probability of being a "0" bit value; and,
   a third comparator having an input to accept the serial data stream, an input establishing a third threshold (Vopt), and an output to provide a signal when the serial data stream input has an approximately equal probability of being a "0" value as a "1" value.

25. The system of claim 24 wherein the future decision circuit supplies a first bit estimate for a serial data stream input below the third threshold and above the second threshold;
   wherein the present decision circuit, in response, supplies:
   a first bit value of "1" when both the second and third bit value are "0" values;
   a first bit value of "0" when only one of the second and third bit values is a "0" value; and,
   a first bit value of "0" when both the second and third bit values are a "1".

26. The system of claim 25 wherein the future decision circuit supplies a first bit estimate for a serial data stream input above the third threshold and below the first threshold;
   wherein the present decision circuit, in response, supplies:
   a first bit value of "0" when both the second and third bit value are "1" values;
   a first bit value of "1" when only one of the second and third bit values is a "1" value; and,
   a first bit value of "1" when both the second and third bit values are a "0".

27. The system of claim 26 wherein the threshold circuit includes:
   a first threshold generator having an input connected to the output of the non-causal circuit and an input to accept the serial data stream, the first threshold generator tracking the serial data stream input voltage when the second and third bit values both equal "1" and maintaining a long-term average of the tracked serial data stream input voltage, the first threshold generator having an output to supply the first threshold (V1) responsive to the long-term average;
   a second threshold generator having an input connected to the output of the non-causal circuit and an input to accept the serial data stream input, the second threshold generator tracking the serial data stream input voltage when the second and third bit values both equal "0" and maintaining a long-term average of the serial data stream input voltage, the second threshold generator having an output to supply the second threshold (V0) responsive to the long-term average; and,
   a third threshold generator having an input to accept the serial data stream input, the third threshold generator measuring a mean voltage of the serial data stream and supplying the third threshold (Vopt) at an output in response to the measured average.

28. The system of claim 27 wherein the multi-threshold circuit accepts a serial data stream encoded with forward error correction (FEC); and,
   the system further comprising:
   a forward error correction (FEC) circuit having an input to receive the first bit value from the non-causal circuit, the FEC circuit decoding the incoming data stream and correcting bit values in response to the decoding, the FEC circuit having an output to supply a stream of corrected data bits; and,
   wherein the third threshold generator has an input to accept the stream of corrected bits from the FEC circuit, the third threshold generator offsetting the third threshold (Vopt) in response to comparing the first bit values to corresponding corrected bit values.

* * * * *